Oct. 15, 1940.    H. B. BIRT ET AL    2,217,787
ADDITION AGENT FOR STORAGE BATTERY PASTE
Original Filed Sept. 2, 1938
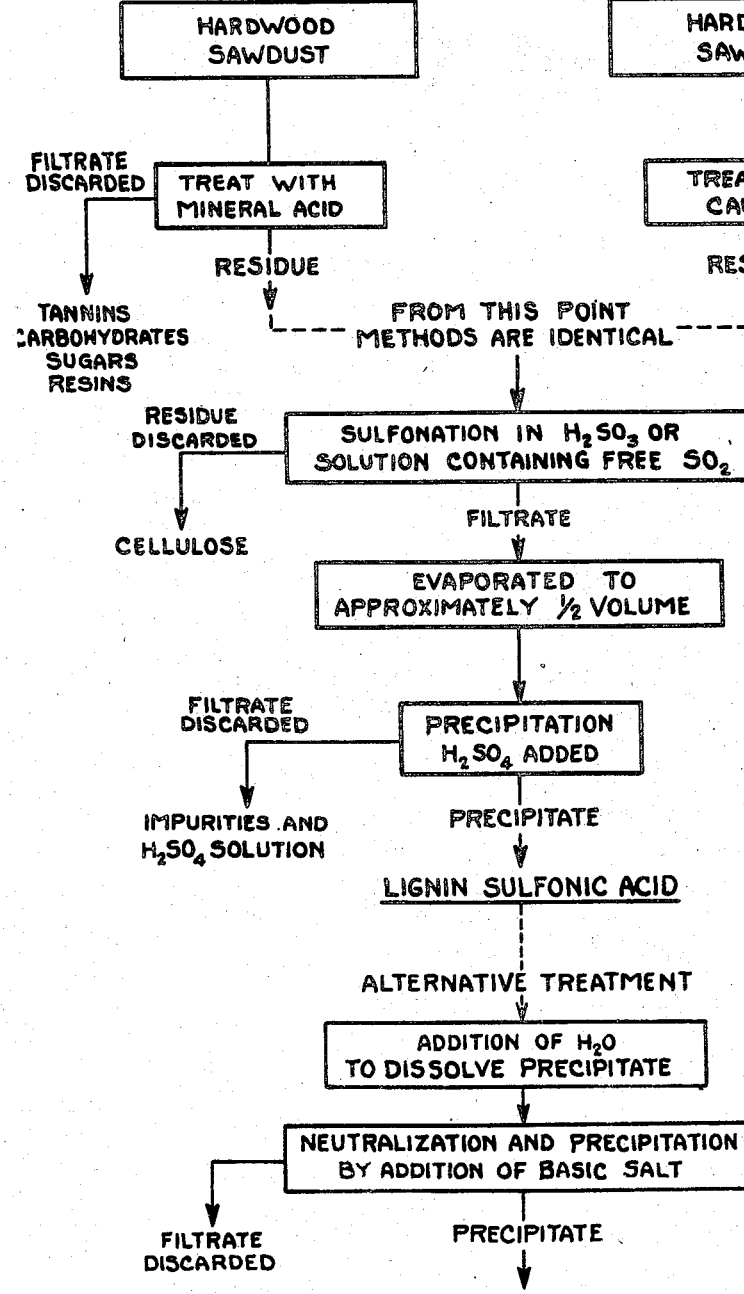

Patented Oct. 15, 1940

2,217,787

UNITED STATES PATENT OFFICE 2,217,787

ADDITION AGENT FOR STORAGE BATTERY PASTE

Howard B. Birt, William C. Pritchard, and Robert A. Daily, Muncie, Ind., assignors to General Motors Corporation, Detroit, Mich., a corporation of Delaware Original application September 2, 1938, Serial No. 228,182. Divided and this application October 21, 1939, Serial No. 300,530

4 Claims. (Cl. 136—26)

This invention relates to an addition agent for use in the manufacture of storage battery paste and is particularly concerned with an addition agent obtained from the chemical treatment of hardwood and to the method of making said addition agent.

This application is a division of our current pending application Serial No. 228,182, filed September 2, 1938.

An object of the invention is to provide a method whereby the lignin of hardwood may be sulfonated and then obtained in the substantially pure state for subsequent use in storage battery paste.

It is a further object of the invention to provide a method for sulfonating certain desirable constituents in hardwood and separating these constituents from the remaining constituents of the wood, such sulfonated constituents being used as addition agents in the paste of the negative battery plate for inhibiting, or greatly retarding, crystal growth of the sponge lead.

A still further object of the invention is to provide an addition agent to be incorporated in the paste of the negative plate of lead storage batteries for inhibiting or substantially preventing the crystal growth of sponge lead, said addition agent being extracted from hardwood and having the characteristic of increasing the electrical capacity of the negative plates at low ambient temperatures while not substantially affecting the density of the plate paste.

Further objects and advantages of the present invention as herein disclosed will become apparent from the following description:

In the drawing the figure is a flow chart indicating the steps in the processes of obtaining sulfonated hardwood lignins and their salts.

It has heretofore been proposed to utilize ligno sulfonic acid as an addition agent for the negative plate paste of lead storage batteries. Such ligno sulfonic acid has either been used in the combined state with various other ingredients or in a substantially pure state, and in both instances has been a product obtained from waste sulfite liquor of the paper mills. This waste sulfite liquor is obtained from the digestion of coniferous woods such as hemlock and spruce, etc., with solutions of calcium bi-sulfite and/or sulfurous acid. By this process the cellulose is separated from the remaining constituents of wood and is used in the manufacture of paper while the waste liquor is a by-product and as herein explained is often used for a battery paste addition agent. It has been found that ligno sulfonic acid in the substantially pure state yields better results in the battery paste than can be obtained by the use of the waste liquor without purification.

The present invention is based upon the discovery that the sulfonated products of the lignins of hardwood have highly superior reactions as addition agents in storage battery paste over the lignins of soft or coniferous woods as heretofore utilized. While much research has been carried on lignins of coniferous wood there has been but very little investigation into the characteristics of the lignins of hardwoods. In the descriptive matter of this invention we will refer to the sulfonated lignins of hardwood as lignin sulfonic acid as differentiated from ligno sulfonic acid, the sulfonated product of the lignins of coniferous woods.

It has been found that lignin sulfonic acid in very small quantities, for example from .02% to 1% when added to the negative plate paste of lead storage batteries substantially prevents crystal growth of sponge lead in the negative plate. We have further found that lignin sulfonic acid has a higher degree of effectiveness for increasing the electrical capacity at low ambient temperatures of the negative plate than any of the addition agents heretofore proposed. Furthermore, lignin sulfonic acid is less soluble in water or acids and has a higher degree of stability to the effect of heat than has ligno sulfonic acid as made from coniferous woods.

Our discovery of the many beneficial effects obtained through the use of lignin sulfonic acid makes possible the production of an improved storage battery plate having high electrical capacity over a wide range of temperatures and which is not deteriorated by crystal growth of sponge lead therein.

It has been found by actual tests that a battery, including hardwood lignin sulfonic acid, as an addition agent to the negative plate paste, has 10% greater electrical capacity at 0° F. than a similar type battery tested under identical conditions but utilizing ligno sulfonic acid from coniferous woods as the addition agent. This improvement in operating characteristics is even further amplified by the fact that the second mentioned battery had 7% by weight more material on the negative plates.

X-ray analyses on negative plates conclusively show that the lead particles therein have a constant growth when no agent is used, such growth gradually deteriorating the plate and lessening its electrical capacity. When lignin sulfonic acid is used as an addition agent, in varying small percentages the growth of the lead crystals is inhibited and substantially prevented throughout the life of the battery plate. X-ray analyses also show that small additions of lignin sulfonic acid substantially prevent crystal growth of the lead sulfate crystals as produced by the discharge of the plates during operation of the battery.

The sulfonated lignins of hardwood as heretofore mentioned have improved characteristics over the sulfonated lignins of soft wood. We attribute this increase in effectiveness to the fact that the lignins have a different structure than the lignins of soft wood, which structural difference carries over into the sulfonated product thereof and thus causes the hardwood lignin sulfonic acid to have different and improved chemical properties over ligno sulfonic acid as derived from coniferous woods.

The preferred method of making lignin sulfonic acid is as follows: 10 lbs. of hardwood, for example red oak, beech, aspen, maple, etc., sawdust, is boiled for a period of three hours in 7 gallons of a weak mineral acid solution, preferably 3% sulfuric acid solution. Phosphoric, hydrochloric or nitric acid may be used, but their use requires exacting control procedure which is unnecessary when using sulfuric acid. This treatment dissolves out the sugars, tannins, carbohydrates and resins which occur as constituents of the wood. This mixture is filtered and the insoluble residue which amounts to about 7½ lbs. is washed, the filtrate usually about 25% by weight of the sawdust used, is discarded. The insoluble residue consisting substantially of cellulose and lignin is next digested in 4 gallons of a solution containing free $SO_2$, or in a sulfurous acid solution or by any other well known method, under 60 lbs. per square inch pressure and for a period of approximately 12 hours. This digestion causes the sulfonation of the hardwood lignin rendering it soluble, while the cellulose remains substantially insoluble. The mixture is filtered and the cellulose residue is discarded. The filtrate consists of about 4 gallons of hardwood lignin sulfonic acid in a concentration of about 7½%. This solution also contains a small quantity of hemi-celluloses which are rendered soluble by the sulfonation process. The filtrate is preferably evaporated to approximately ½ its original volume or two gallons, and to this solution is added two gallons of 40% sulfuric acid solution. The resultant mixture will therefore contain about 25% sulfuric acid which brings the acidity of the solution sufficiently high to precipitate the greater part of the lignin sulfonic acid. The solution is filtered and the precipitate is washed with 20% sulfuric acid solution in which it is insoluble. The filtrate is discarded.

The precipitated lignin sulfonic acid amounts to approximately 2 lbs. and can be mixed directly in the negative plate paste, or in the preferred form, is dissolved in water and the water solution thereof is added to the negative paste. Usually 0.2% to 0.3% by weight of lignin sulfonic acid gives the optimum results in battery performance although greater amounts may be used. An alternative method of adding the material to the paste is to immerse the dried negative plate (before formation) in a 10% water solution of hardwood lignin sulfonic acid in which instance the plate paste absorbs the lignin sulfonic acid to provide substantially similar results.

An alternative method of removing sugars, tannins, carbohydrates and resins from the hardwood sawdust is to use 10 gallons of caustic solution, preferably a 1% sodium hydroxide solution for each 10 lbs. of hardwood sawdust, and treat the sawdust therein for a period of 15 hours at room temperature. After filtering and washing the residue undergoes a procedure similar to that hereinbefore described.

Another modification in the use of the addition agent is to chemically react the hardwood lignin sulfonic acid with a basic salt such as a metal hydroxide whereupon sulfonates are formed. For example, barium hydroxide may be used or any other hydroxide of the alkaline earth metals, or oxides or hydroxides of the heavy metals preferably lead. Preferably barium hydroxide is added to an aqueous solution of hardwood lignin sulfonic acid at room temperature and in quantities sufficient to neutralize the solution. This procedure causes precipitation of the barium salt of lignin sulfonic acid which makes an excellent addition agent for the negative plate paste, since with the addition of sulfuric acid used in formation of the plate, the barium salt is decomposed to form barium sulfate, whereupon the hardwood lignin sulfonic acid is set free. Both of these materials are well dispersed throughout the negative material.

We have found that when making an addition agent in accordance with the procedure outlined herein, that such an addition agent does not increase the density or weight of the plate paste and is therefore highly desirable therein.

While specific quantities and concentrations of ingredients have been specified throughout the description of chemical process used in forming hardwood lignin sulfonic acid, such quantities and concentrations are not limiting, but are merely set forth for illustrative purposes. Variation in the quantities and concentrations of the ingredients may be made without departing from the spirit of our invention so long as the desired results are obtained.

While the embodiment of the present invention as herein disclosed, constitutes a preferred form, it is to be understood that other forms might be adopted, all coming within the scope of the claims which follow.

What is claimed is as follows:

1. A battery plate paste including as an addition agent a sulfonated acid product of hardwood lignin.

2. A battery plate paste including as an addition agent a sulfonated acid product of hardwood lignin ranging in amounts from .02% to 1%.

3. A battery plate paste including as an addition agent hardwood lignin sulfonic acid in amounts ranging from .02% to 1%.

4. A battery plate paste including as an addition agent a metallic sulfonate of hardwood lignin sulfonic acid formed by the reaction of a basic salt and substantially pure hardwood lignin sulfonated acid.

HOWARD B. BIRT.
ROBERT A. DAILY.
WILLIAM C. PRITCHARD.